US012361776B1

(12) United States Patent
Corll et al.

(10) Patent No.: US 12,361,776 B1
(45) Date of Patent: Jul. 15, 2025

(54) DOCUMENTATION LOCKBOX

(71) Applicant: Aurora Operations, Inc., Mountain View, CA (US)

(72) Inventors: Eric David Corll, Dublin, OH (US); Daichi Christopher Matsuda, Redwood City, CA (US); Daniel Alexander Sherman, Irvine, CA (US); Robert Kip Terhune, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 113 days.

(21) Appl. No.: 18/192,143

(22) Filed: Mar. 29, 2023

(51) Int. Cl.
  *G07C 9/00* (2020.01)
  *B60R 7/02* (2006.01)
  *G07C 9/32* (2020.01)
  *G07C 9/38* (2020.01)

(52) U.S. Cl.
  CPC ............ *G07C 9/00896* (2013.01); *B60R 7/02* (2013.01); *G07C 9/00571* (2013.01); *G07C 9/32* (2020.01); *G07C 9/38* (2020.01)

(58) Field of Classification Search
  CPC .. G07C 9/00896; G07C 9/00571; B60R 7/02; B60R 25/34; E05B 81/72
  See application file for complete search history.

(56) References Cited

U.S. PATENT DOCUMENTS

| | | | |
|---|---|---|---|
| 10,814,833 B1* | 10/2020 | Goetzinger | B60R 25/23 |
| 2013/0055933 A1* | 3/2013 | Markman | E05G 1/005 |
| | | | 29/525.01 |
| 2021/0293075 A1* | 9/2021 | Oesterling | G07C 9/00896 |

* cited by examiner

*Primary Examiner* — Vernal U Brown
(74) *Attorney, Agent, or Firm* — PATENT LAW WORKS LLP (57) ABSTRACT

A document lockbox system includes a receptacle positioned within an exterior panel of a vehicle, at least one document retention device, at least one door that provides access into the receptacle, at least one lock to lock and to unlock the door, and at least one lock interface configured to actuate the at least one lock. At least one processor and a memory operably coupled with the at least one processor, wherein the memory stores instructions that cause the at least one processor to perform operations includes actuating the at least one lock. A method of accessing the lockbox includes contacting a remote data center, verifying an identity of the user, transmitting the lock interface code, receiving a lock interface code, and entering the lock interface code into the at least one lock interface.

20 Claims, 8 Drawing Sheets

DOCUMENTATION LOCKBOX

BACKGROUND

The transportation industry is typically heavily regulated and often requires operators to present an assortment of documentation to law enforcement and other administrative agencies upon request. As autonomous vehicles become more prevalent, the operator may be located remotely or entirely absent. Regardless of the presence of the operator, there still exists a need to present documents for inspection. Consequently, there exists a need to securely store such documents, to provide access to those documents to verified authorities when required to do so, and to prevent unauthorized access to an interior of the vehicle and its operating systems.

SUMMARY

The present disclosure describes a document lockbox system for use in a vehicle. The document lockbox system may include a receptacle positioned within an exterior panel of the vehicle. At least one document retention device may be configured to secure at least one document within the receptacle. At least one door provides may provide access into the receptacle. At least one lock may be configured to lock the door and to unlock the door. At least one lock interface may be configured to allow a user to actuate the at least one lock. At least one processor and a memory operably coupled with the at least one processor, wherein the memory stores instructions that, in response to execution of the instructions by the at least one processor, may cause the at least one processor to perform operations including actuating the at least one lock to one of lock and unlock the lock.

Other implementations of one or more of these aspects include corresponding systems, apparatus, and computer programs, configured to perform the actions of the methods, encoded on computer storage devices.

These and other implementations may each optionally include one or more of the following aspects. For instance, the document lockbox system may include instructions that, in response to execution of the instructions by the at least one processor, cause the at least one processor to perform operations including receiving a lock interface code from the data center.

The document lockbox system may include at least one lock sensor configured to detect at least one of a locked position and an unlocked position of the at least one lock. The instructions that, in response to execution of the instructions by the at least one processor, may cause the at least one processor to perform operations including receiving a lock position signal from the at least one lock sensor.

The document lockbox system may include at least one door sensor configured to detect at least one of an open position and a closed position of the at least one door. The instructions that, in response to execution of the instructions by the at least one processor, may cause the at least one processor to perform operations including receiving a door position signal from the at least one door sensor.

The document lockbox system may include a door actuation mechanism configured to at least one of open the door and close the door. The door actuation mechanism optionally is one of a cam and a solenoid.

The lock interface may include one of a keypad, a touchpad, and a combination lock.

The document lockbox system may include an output interface electrically coupled to the at least one processor, the output interface being configured to display at least one datum to the user.

The document lockbox system may include a key box positioned with the receptacle.

A vehicle may include any one or more of the foregoing elements of the document lockbox system in any combination as described above. For brevity, all potential elements and combinations are not redescribed here. As one example, a vehicle may include a power train and a receptacle positioned within an exterior panel of the vehicle. The vehicle may also include a document lockbox system. The document lockbox system may include at least one document retention device configured to secure at least one document within the receptacle. At least one door may provide access into the receptacle. At least one lock may be configured to lock the door and to unlock the door. At least one lock interface may be configured to allow a user to actuate the at least one lock. The vehicle may also include a vehicle control system that includes at least one processor and a memory operably coupled with the at least one processor, wherein the memory stores instructions that, in response to execution of the instructions by the at least one processor, may cause the at least one processor to perform operations including actuating the at least one lock to one of lock and unlock the lock.

Optionally, the vehicle control system may provide one of full control and semi-autonomous control over the vehicle. In addition, the vehicle may be a truck. The instructions that, in response to execution of the instructions by the at least one processor, may cause the at least one processor to perform operations including receiving a lock interface code from the data center.

The document lockbox system of the vehicle may also include at least one lock sensor configured to detect at least one of a locked position and an unlocked position of the at least one lock. The instructions that, in response to execution of the instructions by the at least one processor, may cause the at least one processor to perform operations including receiving a lock position signal from at least one lock sensor.

A vehicle control system for a vehicle may include any one or more of the foregoing elements of the document lockbox system in any combination as described above. For brevity, all potential elements and combinations are not redescribed here. As one example, a vehicle control system for a vehicle, may include a document lockbox system. The document lockbox system may include a receptacle positioned within an exterior panel of the vehicle. The document lockbox system may also include at least one document retention device configured to secure at least one document within the receptacle. At least one door may provide access into the receptacle. At least one lock may be configured to lock the door and to unlock the door. At least one lock interface may be configured to allow a user to actuate the at least one lock. The vehicle control system may include at least one processor and a memory operably coupled with the at least one processor, wherein the memory stores instructions that, in response to execution of the instructions by the at least one processor, cause the at least one processor to perform operations including actuating the at least one lock to one of lock and unlock the lock.

The instructions that, in response to execution of the instructions by the at least one processor, may cause the at least one processor to perform operations including receiving a lock interface code from the data center.

The document lockbox system of the vehicle control system may also include at least one lock sensor configured to detect at least one of a locked position and an unlocked position of the at least one lock. The instructions that, in response to execution of the instructions by the at least one processor, may cause the at least one processor to perform operations including receiving a lock position signal from at least one lock sensor.

This specification also relates to methods for a user to actuate a lock of a door on an exterior of a vehicle and/or to access a document stored within a document lockbox. The method may be implemented by the document lockbox system and/or the vehicle control system as described above and below. The method may include one or more of the following steps implemented in any order, including contacting at least a remote data center; transmitting the lock interface code from the data center; receiving a lock interface code from the remote data center; and entering the lock interface code into at least one lock interface, wherein the at least one lock interface is configured to allow the user to actuate at least one lock configured to lock the door and to unlock the door. At least one processor and a memory operably coupled with the at least one processor, wherein the memory stores instructions that, in response to execution of the instructions by the at least one processor, may cause the at least one processor to perform operations may include actuating the at least one lock to one of lock and unlock the lock.

These and other implementations may each optionally include one or more of the following aspects. For instance, the method may include where one of the user and the processor enters the lock interface code into the lock interface.

The step of transmitting the lock interface code may include transmitting the lock interface code to the user via at least one of an application, a short message service, a personal digital device of the user, and aurally to the user.

The method may also include retrieving at least one document from the lockbox. The method may also include returning the at least one document to the lockbox and closing the door.

The method may also include verifying an identity of the user. The step of transmitting the lock interface code may occur after verifying the identity of the user.

The method may include providing confirmation to the data center that the user has closed the door and the vehicle is allowed to depart.

The method may include obtaining a vehicle key from a key box in the lockbox.

BRIEF DESCRIPTION OF THE DRAWINGS

These and other aspects and features of the present implementations will become apparent upon review of the following description of specific implementations in conjunction with the accompanying figures, wherein.

DETAILED DESCRIPTION

Overview

As mentioned, the transportation industry is typically heavily regulated and often requires operators to present an assortment of documents to law enforcement and other administrative agencies upon request. For example, during a traffic stop a driver may have to present proof of registration, insurance, and perhaps other information to satisfy statutory and regulatory requirements. In the transportation industry, this information may additionally include bills of lading, manifests, inspection records, weight information, owner/contact information, permits, hazardous material information, and more. These documents may need to be presented not only to law enforcement officers, but to an assortment of other regulatory officers, customers, and the like.

Typically, these documents, at least in the transportation/shipping context, are collated in a binder for organization and ease of access. A driver will present the information to a requesting officer, agency contact, and the like. Inherently in this process, the driver is able to observe and typically simultaneously confirm the identity of the requesting officer or agency contact. For example, at a traffic stop or a port of entry, the driver may observe the officer's credentials, location, and other contextual clues to confirm the requesting officer's identity and affirm that the officer is eligible to receive and review the documents.

As autonomous vehicles become more prevalent, however, the operator may be located remotely or entirely absent. Regardless of the presence of the operator, there still exists a need to present any required documents for inspection upon demand. Consequently, there exists a need to securely store such documents, to provide access to those documents to verified authorities when required to do so, and to prevent unauthorized access to an interior of the vehicle and its operating systems.

Autonomous Vehicle

Figure 1:
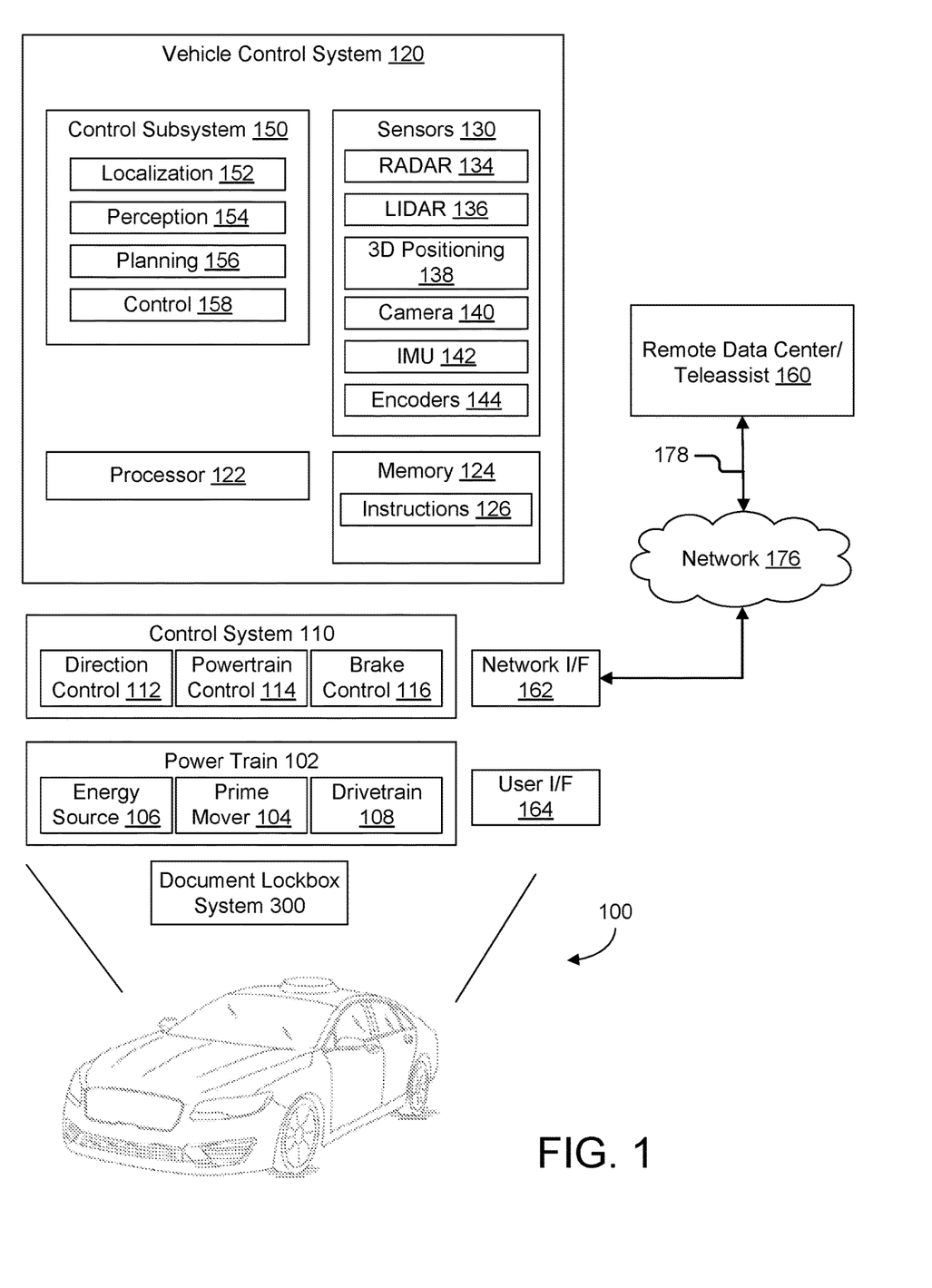
FIG. 1 is a block diagram illustrating an example hardware and software environment for an autonomous vehicle according to some implementations.

Referring to the drawings, wherein like numbers denote like parts throughout the several views, FIG. 1 illustrates an example hardware and software environment for an autonomous vehicle within which various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling by land, by sea, by air, underground, undersea, and/or in space, and it will be appreciated that the aforementioned components 102-116 may vary widely based upon the type of vehicle within which these components are utilized.

For simplicity, the implementations discussed hereinafter will focus on a wheeled land vehicle such as a car, van, truck, bus, etc. In such implementations, the prime mover 104 may include one or more electric motors and/or an internal combustion engine (among others). The energy source 106 may include, for example, a fuel system (e.g., providing gasoline, diesel, hydrogen, etc.), a battery system, solar panels, or other renewable energy sources, and/or a fuel cell system. The drivetrain 108 includes wheels and/or tires along with a transmission and/or any other mechanical drive components suitable for converting the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some implementations, multiple electric motors (e.g., dedicated to individual wheels or axles) may be used as a prime mover. In the case of a hydrogen fuel cell implementation, the prime mover 104 may include one or more electric motors and the energy source 106 may include a fuel cell system powered by hydrogen fuel.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to airplanes, space vehicles, helicopters, drones, military vehicles, all-terrain or tracked vehicles, ships, submarines, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, full or semi-autonomous control over the vehicle 100 is implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle 100. For example, sensors 130 can include RADAR sensor 134, LIDAR (Light Detection and Ranging) sensor 136, a 3D positioning sensor 138, e.g., a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can optionally include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle 100 in three directions. One or more encoders 144, such as wheel encoders may be used to monitor the rotation of one or more wheels of vehicle 100.

The vehicle control system 120 may also be operatively coupled to a document lockbox system 300 that will be described in further detail below. The document lockbox system 300 provides for controlled access for authorized users to various documents, such as documents required by law and/or regulation, and potentially provide access to a key or other method of access an interior of the vehicle.

The outputs of sensors 130 may be provided to a set of control subsystems 150, including, a localization subsystem 152, a perception subsystem 154, a planning subsystem 156, and a control subsystem 158. The localization subsystem 152 is principally responsible for precisely determining the location and orientation (also sometimes referred to as "pose") of the vehicle 100 within its surrounding environment, and within some frame of reference. The perception subsystem 154 is principally responsible for detecting, tracking, and/or identifying objects within the environment surrounding vehicle 100. A machine learning model in accordance with some implementations can be utilized in tracking objects. The planning subsystem 156 is principally responsible for planning a trajectory or a path of motion for vehicle 100 over some timeframe given a desired destination as well as the static and moving objects within the environment. A machine learning model in accordance with some implementations can be utilized in planning a vehicle trajectory. The control subsystem 158 is principally responsible for generating suitable control signals for controlling the various controls in the vehicle control system 120 in order to implement the planned trajectory of the vehicle 100. Similarly, a machine learning model can be utilized to generate one or more signals to control the autonomous vehicle 100 to implement the planned trajectory.

It will be appreciated that the collection of components illustrated in FIG. 1 for the vehicle control system 120 is merely one example. Individual sensors may be omitted in some implementations. Additionally, or alternatively, in some implementations, multiple sensors of the same types illustrated in FIG. 1 may be used for redundancy and/or to cover different regions around a vehicle. Moreover, there may be additional sensors beyond those described above to provide actual sensor data related to the operation and environment of the wheeled land vehicle. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1. Each processor 122 may be implemented, for example, as a microprocessor and each memory may represent the random-access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors 122 illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid-state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons, and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 176 to permit the communication of information with other computers and electronic devices, including, for example, a central service, such as a cloud service, from which the vehicle 100 receives information including trained machine learning models and other data for use in autonomous control thereof. The one or more networks 176, for example, may be a communication network that includes a wide area network ("WAN") such as the Internet, one or more local area networks ("LANs") such as Wi-Fi LANs, mesh networks, etc., and one or more bus subsystems. The one or more networks 176 may optionally utilize one or more standard communication technologies, protocols, and/or inter-process communication techniques. In some implementations, data collected by the one or more sensors 130 can be uploaded to a remote data center 160, that may include a computing system (not illustrated) via the network 176 for additional processing.

In the illustrated implementation, the vehicle 100 may communicate via the network 176 with a remote data center 160 for the purposes of implementing various functions described below.

Each processor illustrated in FIG. 1, as well as various additional controllers and subsystems disclosed herein, operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer (e.g., computing system 172) coupled to vehicle 100 via network 176, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module, or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program codes described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The example environment illustrated in FIG. 1 is not intended to limit implementations disclosed herein. Indeed, other alternative hardware and/or software environments may be used without departing from the scope of implementations disclosed herein.

Figure 2:
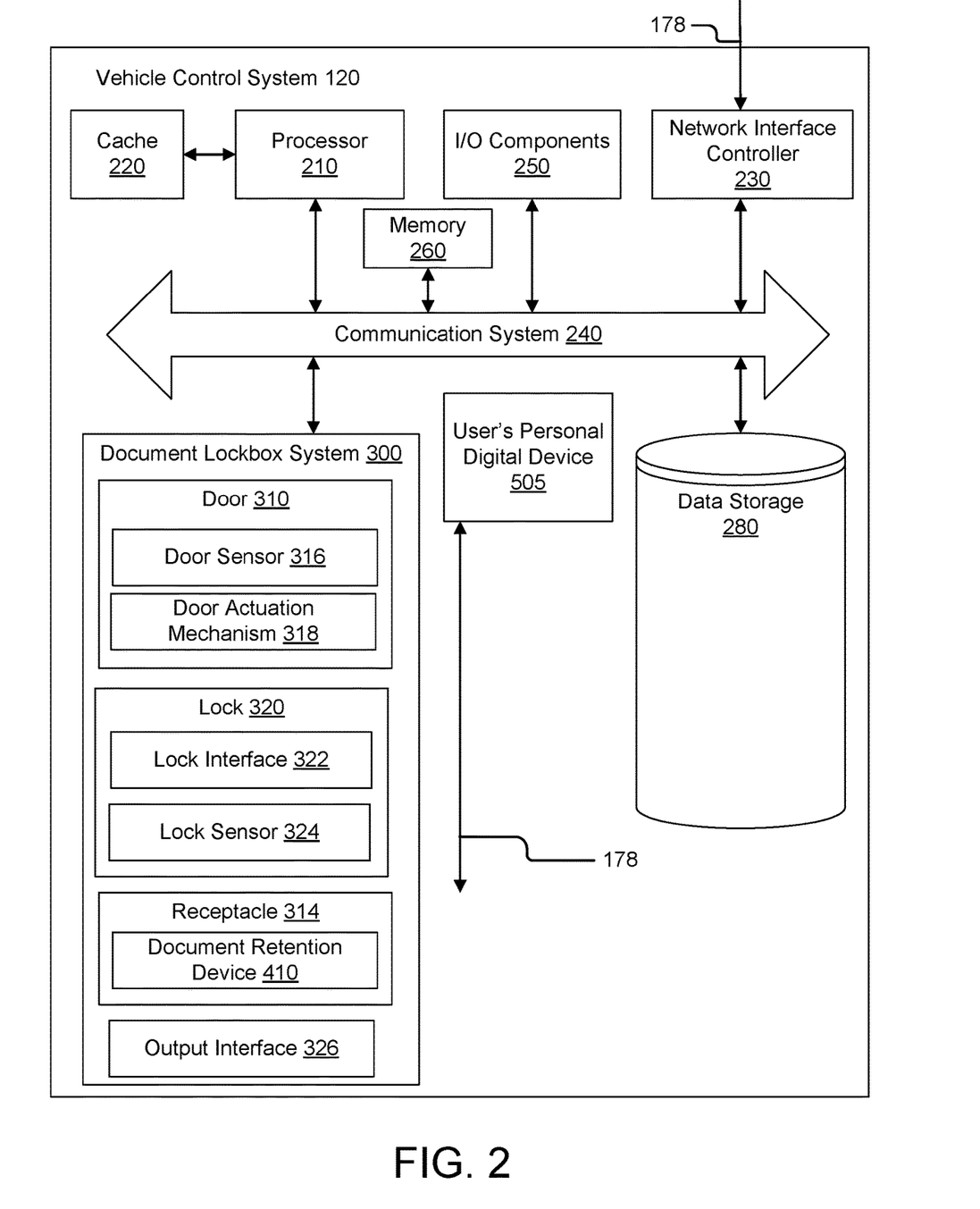
FIG. 2 is a block diagram illustrating an example computing system for the document lockbox system according to some implementations.

FIG. 2 is a block diagram illustrating an example of a remote data center 160 for concurrently interfacing with and perform aspects of the method for opening and/or accessing a document lockbox according to some implementations.

Referring to FIG. 2, the illustrated example the vehicle control system 120 includes one or more processors 210 in communication, via a communication system 240 (e.g., bus), with memory 260, at least one network interface controller 230 with network interface port for connection to a network (e.g., network 176 via signal line 178), a data storage 280, and other components, e.g., an input/output ("I/O") components interface 250 connecting to a display (not illustrated) and an input device (not illustrated). The processor(s) 210 will execute instructions (or computer programs) received from memory 260. The processor(s) 210 illustrated incorporate, or are directly connected to, cache memory 220. In some instances, instructions are read from memory 260 into the cache memory 220 and executed by the processor(s) 210 from the cache memory 220.

In more detail, the processor(s) 210 may be any logic circuitry that processes instructions, e.g., instructions fetched from the memory 260 or cache 220. In some implementations, the processor(s) 210 are microprocessor units or special purpose processors. The vehicle control system 120 may be based on any processor, or set of processors, capable of operating as described herein. The processor(s) 210 may be a single core or multi-core processor(s). The processor(s) 210 may be multiple distinct processors.

The memory 260 may be any device suitable for storing computer readable data. The memory 260 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). The vehicle control system 120 may have any number of memory devices as the memory 260.

The cache memory 220 is a form of computer memory placed in close proximity to the processor(s) 210 for fast read times. In some implementations, the cache memory 220 is part of, or on the same chip as, the processor(s) 210. In some implementations, there are multiple levels of cache 220, e.g., L2 and L3 cache layers.

The network interface controller 230 manages data exchanges via the network interface (sometimes referred to as network interface ports). The network interface controller 230 handles the physical and data link layers for network communication. In some implementations, some of the network interface controller's tasks are handled by one or more of the processors 210. In some implementations, the network interface controller 230 is part of a processor 210. In some implementations, the vehicle control system 120 has multiple network interfaces controlled by a single controller 230. In some implementations, the vehicle control system 120 has multiple network interface controllers 230. In some implementations, each network interface is a connection point for a physical network link (e.g., a cat-5 Ethernet link). In some implementations, the network interface controller 230 supports wireless network connections and an interface port is a wireless (e.g., radio) receiver/transmitter (e.g., for any of the IEEE 802.11 protocols, near field communication "NFC", Bluetooth, ANT, WiMAX, 5G, or any other wireless protocol). In some implementations, the network interface controller 230 implements one or more network protocols such as Ethernet. The vehicle control system 120 exchanges data with other computing devices via physical or wireless links (represented by signal line 178) through a network interface. The network interface may link directly to another device or to another device via an intermediary device, e.g., a network device such as a hub, a bridge, a switch, or a router, the vehicle control system 120 to a data network such as the Internet.

The data storage 280 may be a non-transitory storage device that stores data for providing the functionality described herein. The data storage 280 may store, among other data, including code keys, sensor data, and any other data.

The vehicle control system 120 may include, or provide interfaces for, one or more input or output ("I/O") devices 250. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers. Other components may include an I/O interface, external serial device ports, and any additional co-processors. For example, a computing system 172 may include an interface (e.g., a universal serial bus (USB) interface) for connecting input devices, output devices, or additional memory devices (e.g., portable flash drive or external media drive). In some implementations, the vehicle control system 120 includes an additional device such as a co-processor, e.g., a math co-processor can assist the processor 210 with high precision or complex calculations.

Document Lockbox System

As discussed above, autonomous vehicles, despite the lack of a driver, may need to still present various documents to an authorized individual upon demand. Such documents might include various bill(s) of lading, manifests, vehicle inspection documents and weight information, vehicle registration, proof of insurance, owner/contact information, permits, hazardous material information, and more.

The vehicle control system 120 may be operably coupled to a document lockbox system 300 that may include one or more of the components in FIGS. 2-6.

Figure 3:
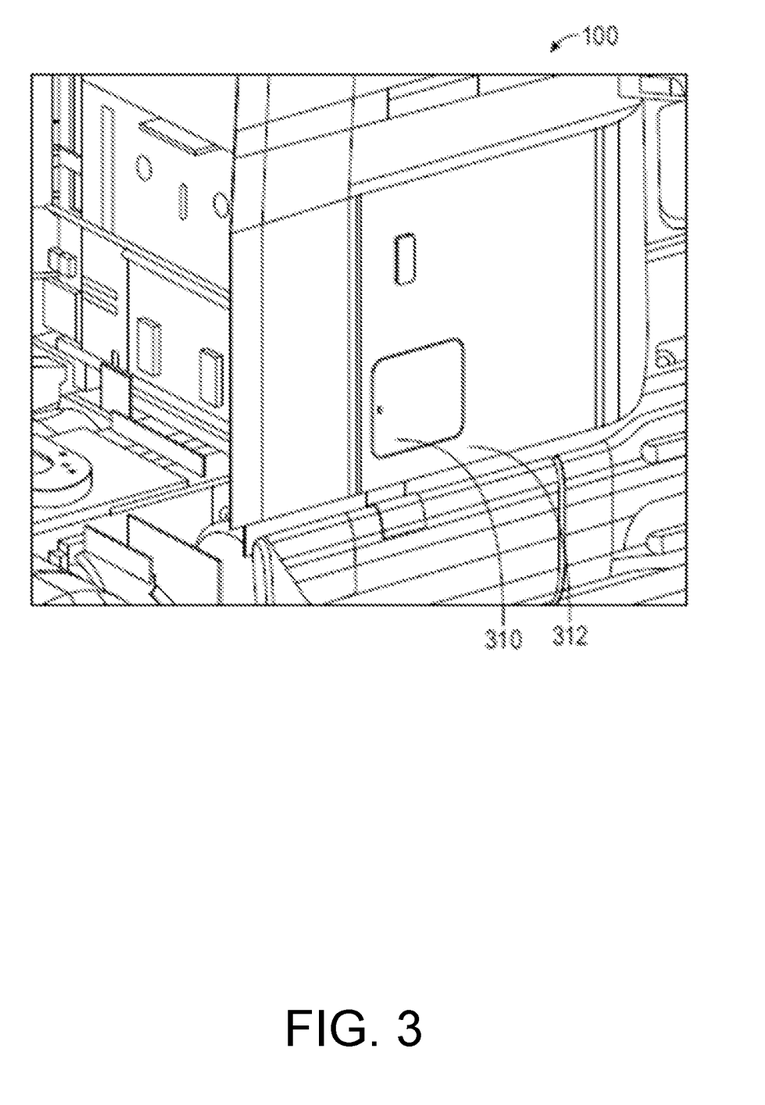
FIG. 3 illustrates an exterior of a vehicle and the exterior of the document lockbox according to some implementations.
Figure 4:
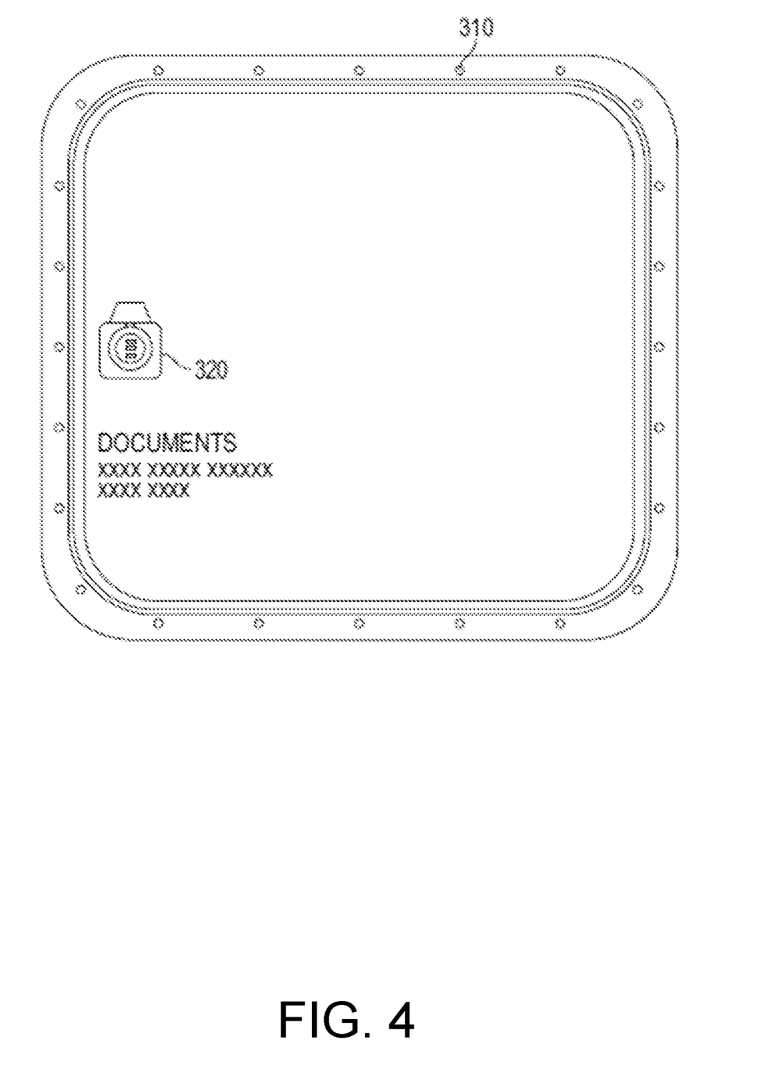
FIG. 4 illustrates an exterior of the document lockbox according to some implementations.
Figure 5:
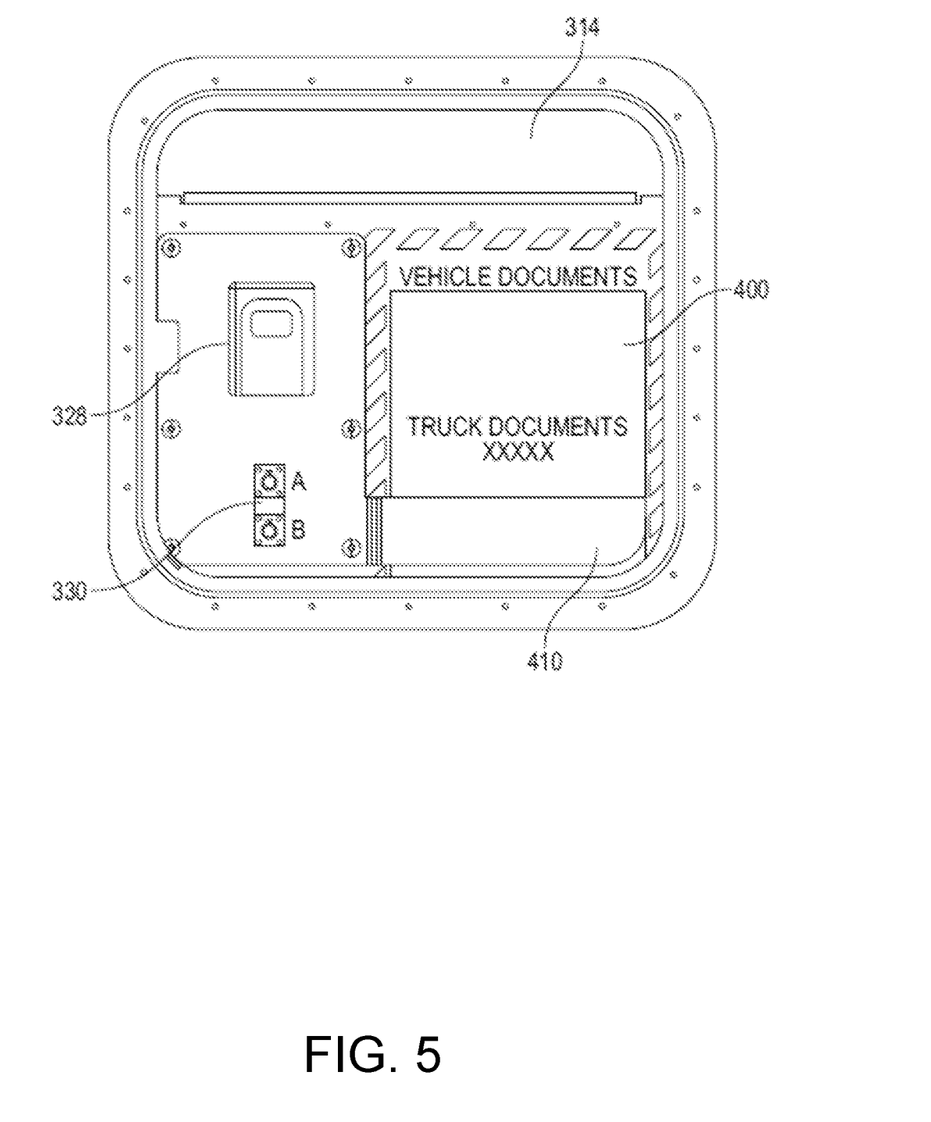
FIG. 5 illustrates an interior receptacle of the document lockbox according to some implementations.

A door 310 may be positioned on an exterior of the vehicle 100, which as illustrated in FIG. 3 is a truck cab, although the vehicle 100 may be any type as discussed above. The door 310 may be positioned in an exterior body panel 312, and provide access to a receptacle 314 positioned within the exterior panel 312 (FIG. 5). The receptacle 314 provides an enclosed space or recess for storing a document or documents 400. The receptacle 314 may be of any shape and have any depth sufficient for storing a document 400, including square, rectangular, cylindrical, cubic, ovoid, spherical, and the like. Consequently, the receptacle 314 may have any variety of dimensions, including a length, width, depth, radius or radii of curvature, focus, diameter, and the like, to describe the geometric shape of the receptacle 314.

Figure 6:
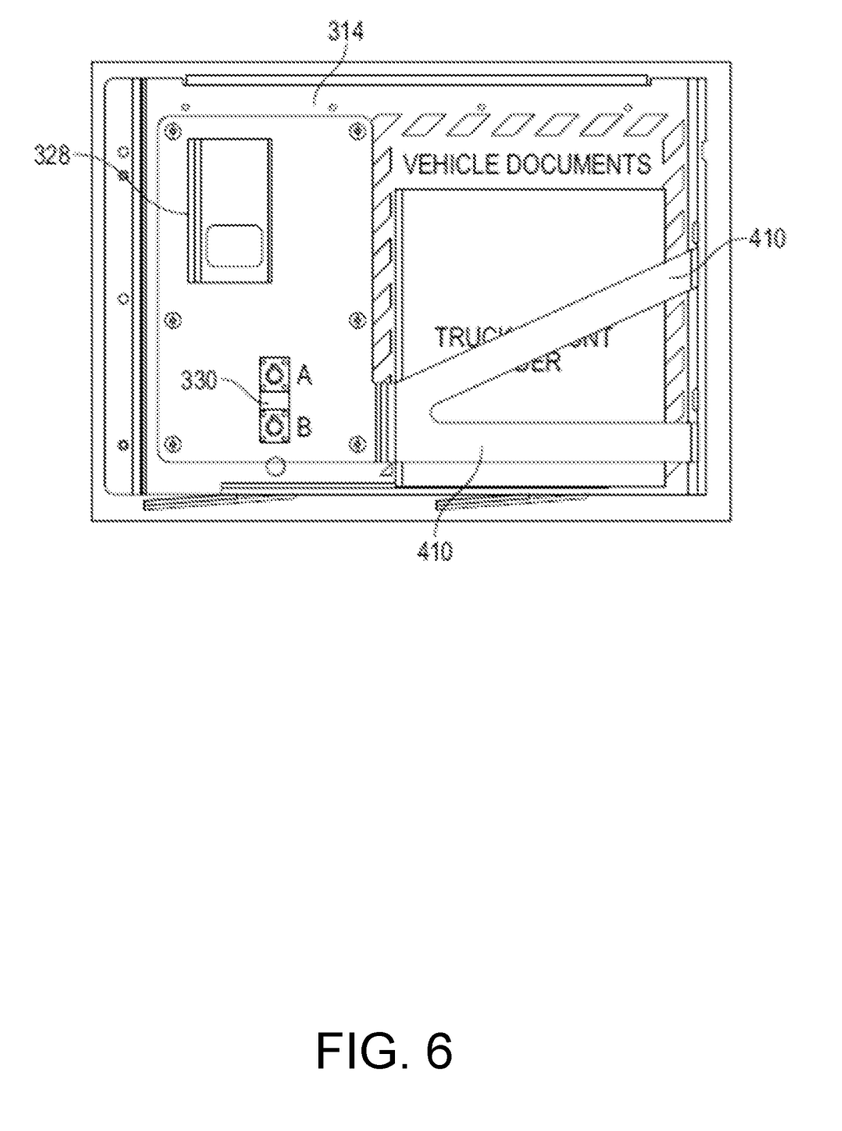
FIG. 6 illustrates another interior receptacle of the document lockbox according to some implementations.

The document lockbox system 300 may include at least one document retention device 410 configured to secure at least one document 400 within the receptacle 314. The document retention device 410 may be a sleeve, a flexible band, cloth, elastic band or strap, a metal band, and the like, or combinations thereof. The document retention device 410 may be a single strap/arm/band with a width and length (unlabeled) as illustrated in FIG. 5 or it may include a plurality of straps/arms/bands, each with a width and length (unlabeled) as illustrated in FIG. 6. The document retention device 410 may include hinges that permit the document retention device 410 to pivot open and close around an axis, one or more latches and/or locks or other structures that allow the document retention device 410 to securely retain the document 400 while also permitting a user to remove and return the document 400 into the receptacle 314 to be secured by the document retention device 410.

The document lockbox system 300 may include at least one door sensor 316 configured to detect at least one of an open position and a closed position of the at least one door 310. The at least one door sensor 316 may generate a door position signal and transmit the door position signal to the processor 210 of the vehicle control system 120. In other words, the processor 210 of the vehicle control system 120 may receive the door position signal from at least one door sensor 316.

The document lockbox system 300 may include a door actuation mechanism 318 configured to at least one of open the door and close the door 310. The door actuation mechanism 318 may include a spring-loaded system, a cam and/or a solenoid, a hydraulic cylinder or other linear actuator (such as pulley system or rack and pinion system), any variety of linked bar mechanisms, and the like. The door actuation mechanism 318 may be operably coupled to the processor 210 of the vehicle control system 120 and open and/or close upon receipt of a door actuation signal from the processor 210 in accordance with a program or operating instructions.

At least one lock 320 may be included in document lockbox system 300. The at least one lock 320 may be configured to lock the door 310 and to unlock the door 310. The at least one lock 320 may be a mechanical lock, and electro-magnetic lock, or any other type of lock. The document lockbox system 300 may also include at least one lock sensor 324 configured to detect at least one of a locked position and an unlocked position of the at least one lock. The at least one lock sensor 324 may be operably coupled to the processor 210 of the vehicle control system 120 and open and/or close upon receipt of a door actuation signal from the processor 210 in accordance with a program or operating instructions.

At least one lock interface 322 is configured to allow a user to actuate the at least one lock 320 may be included in document lockbox system 300. The at least one lock interface 322 may be a key/keyhole interface, a combination lock of any type into which a user enters a provided combination, a touchpad or keypad entry system (whether a touchscreen or buttons of any type/combination), a microphone to receive a spoken or speaker generated combination, a camera to observe a code (alphanumeric, Quick Response or QR code, other computer generated code, facial recognition), and other similar types of lock interfaces. The at least one lock interface may be operably coupled mechanically to the at least one lock 320 in the event both are entirely mechanical, or the at least one lock interface 322 may be operably coupled to the processor 210 of the vehicle control system 120 and configured to transmit and/or receive a lock interface signal to actuate the at least one lock 320 in entirely electrical or hybrid electro-mechanical lock systems.

Optionally, the document lockbox system 300 may include at least one output interface 326 electrically coupled to the at least one processor 210. The output interface 326 may be being configured to display at least one datum to the user as transmitted by the at least one processor to the output interface 326. The output interface 326 may be a speaker for audio output of the at least one datum and/or it may include a visual display, such as a liquid crystal display screen that may display alphanumeric characters and/or images such as QR codes and bar codes.

The document lockbox system 300 may include a key box 328, or a plurality of key boxes, positioned within the receptacle 314. The key box 328 may be any size container or receptacle to receive, typically, a key that could provide access to a door into a cab of the vehicle 100, although other items may be stored within the key box 328. The key box 328 may have a separate lock or it may otherwise be merely closed (if entirely contained within an enclosure) or otherwise permit access to a key or other items once a user has obtained access to the receptacle 314.

The document lockbox system 300 may include an electrical receptacle 330, which may be any type of receptacle that permits the transmission and/or reception of data and/or power, such as an AC or DC outlet, an ethernet connect, any type of USB-A/B/C connection, and other known connections. The electrical receptacle 330 optionally may be operably coupled to the vehicle control system 120 and/or any of the subcomponents of the vehicle control system as discussed above.

Optionally, the document lockbox system 300 may include a mechanical and/or electro-mechanical override (not illustrated) that could release and/or bypass the at least one lock 320 in the event the vehicle 100 is disabled or otherwise lacks electrical power to operate the various computer/control systems and processors. For example, a mechanical lever in an interior of the vehicle 100, such as in a cab of the vehicle 100, may be mechanically linked via a cable system to the at least one lock 320 that releases a latch and allows the at least one door 310 to be opened. The mechanical and/or electro-mechanical override may include a battery or other self-contained and/or rechargeable power source sufficient to operate any electrical components of the mechanical and/or electro-mechanical override without the need for power from the powertrain 102 or other on-board electrical source, such as a vehicle battery. Optionally, the mechanical and/or electro-mechanical override may only be accessible to an authorized maintenance or company personnel. In other words, the mechanical and/or electro-mechanical override may be positioned or accessible in such away that third parties, including officers and/or government agency personnel may not have unauthorized access to the mechanical and/or electro-mechanical override.

The processor 210 of the document lockbox system 300 may be configured to perform operations including one or more of the following, in any order: receiving a lock interface code from the data center 160; actuating the at least one lock 320 to one of lock and unlock the lock 320; receiving a lock position signal from at least one lock sensor 324.

Methods of operating a document lockbox 300 are also disclosed. Consider, for example, an instance in which a law enforcement officer wishes to stop the autonomous vehicle 100 for an inspection or other event. The law enforcement officer actuates her sirens or otherwise signals for the autonomous vehicle 100 to stop. Once the autonomous vehicle 100 is stopped, the law enforcement officer may approach the autonomous vehicle 100 and, upon recognizing the autonomous vehicle 100 for what it is, begin following an established protocol to contact the remote data center/teleassist 160 or observe instructions provided on or near the at least one door 310 to contact the remote data center/teleassist 160. For example, the instructions provided on or near the at least one door 310 may include a phone number for the officer to contact and/or a website address and/or a barcode/quick response (QR) code or other similar code by which the officer may access the remote data center 160 via the officer's personal digital device 505.

Figure 7:
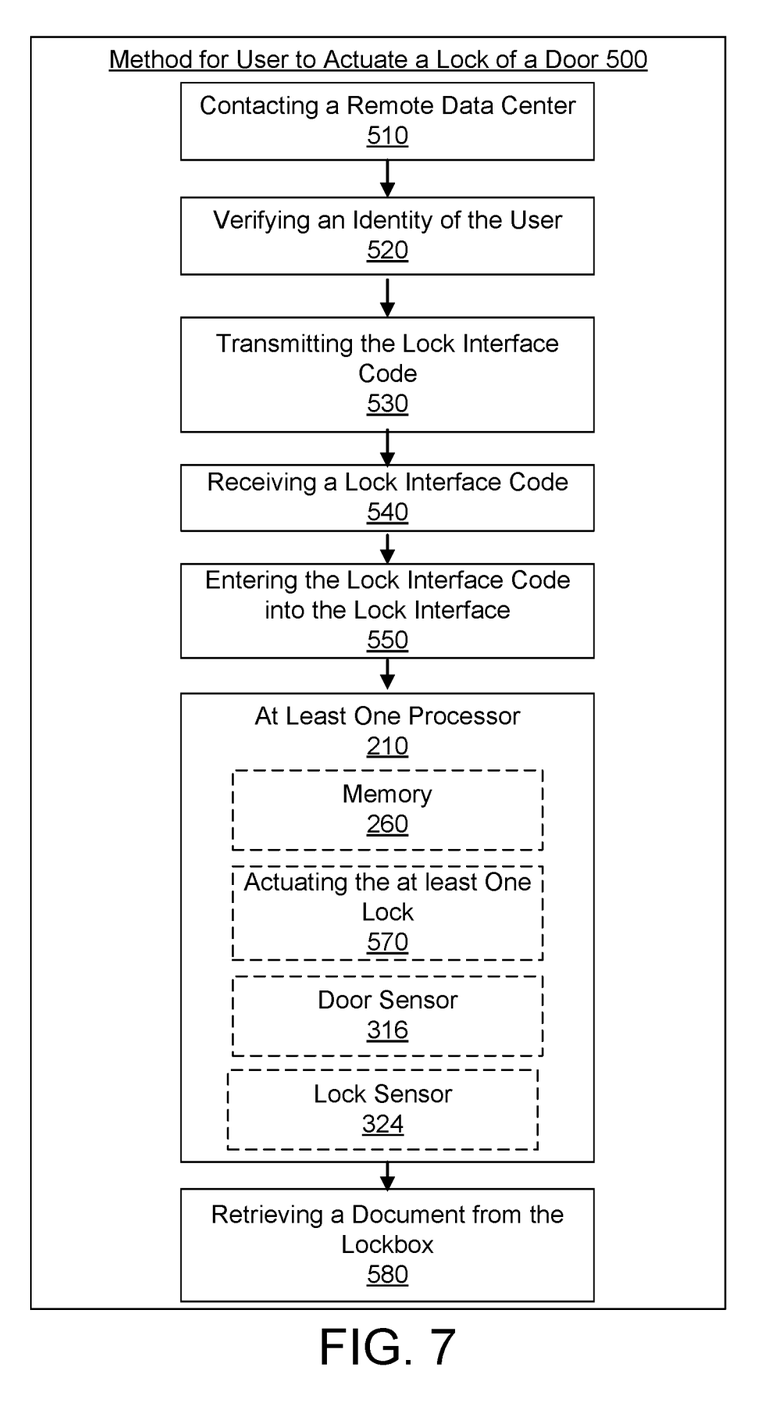
FIG. 7 is a flow chart illustrating a method of accessing a document lockbox according to some implementations.
Figure 8:
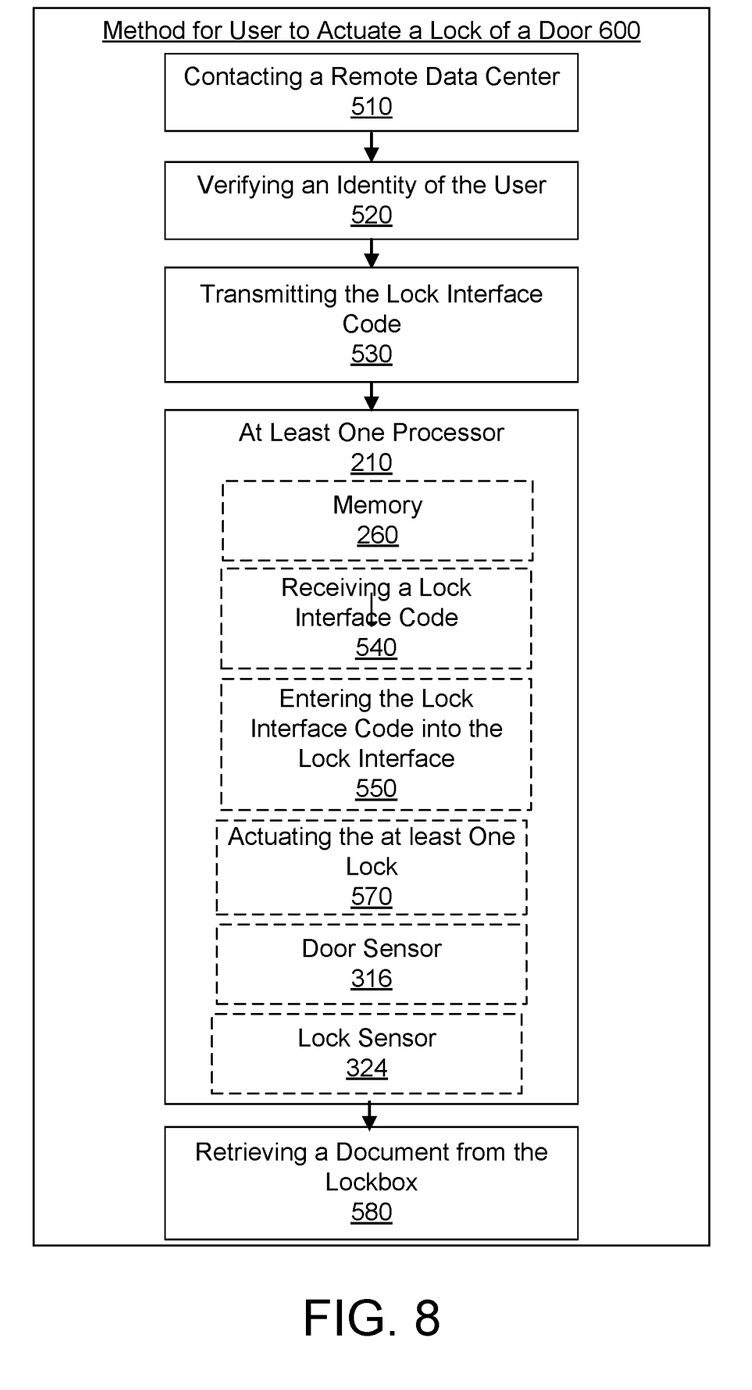
FIG. 8 is a flow chart illustrating another method of accessing a document lockbox according to some implementations.

FIGS. 7 and 8 illustrates various methods 500 and 600 of accessing the document lockbox system 300. The steps of each method may be performed in any order and in any combination via a user, remote data center, and/or computer program as one of skill in the art would appreciate. Thus, the methods 500 and 600 illustrated in FIGS. 7 and 8 are merely exemplary.

In FIGS. 7 and 8, the methods 500 and 600 illustrate step 510 in which the hypothetical law enforcement officer or other authorized user contacts a remote data center via the user's personal digital device 505 via signal line 178 (FIG. 2). The user's personal digital device 505 may be a cell phone, 2-way pager, personal digital assistance, tablet computer, laptop or desktop computer, walkie-talkie, landline telephone, satellite phone, or any other method of contacting the remote data center 160.

The remote data center 160 verifies the identity of the user at step 520. This step may occur by the remote data center 160 contacting the officer's dispatcher or the agency for which the user works, by asking the officer/user one or more questions, the use of two-factor authentication systems, and the like.

The remote data center 160 will transmit a lock interface code to the officer/user (FIG. 7; steps 530 and 540) or to the at least one processor 210 (FIG. 8) at step 530. The lock interface code may be received directly at the officer/user's personal digital device 505 or to the officer/user aurally or visually via a digital application on the user's personal digital device 505, a text or short message service system with alphanumeric data, e-mail, and so forth. Optionally, the step 530 of transmitting the lock interface code may occur after verifying the identity of the officer/user.

At step 550, the officer/user enters the locker interface code into the at least one lock interface 322 as seen in FIG. 7, or as mentioned the remote data center 160 transmits the lock interface code to the at least one processor 210, which in turn electronically enters the lock interface code into the lock interface 322 as seen in FIG. 8. In the latter case, the lock interface code may be a digital signal or instruction or other form of computer or digital code transmitted to the at least one processor 210 rather than necessarily an alphanumeric code—for example, "1-2-3-4-5"—that might be transmitted to the officer for manual entry into a mechanical or electro-mechanical combination/keypad or the like.

At least one processor and a memory operably coupled with the at least one processor, wherein the memory stores instructions that, in response to execution of the instructions by the at least one processor, cause the at least one processor to perform operations may include actuating the at least one lock to one of lock and unlock the lock.

Upon entering the lock interface code into the lock interface, the at least one lock 320 is actuated at 570.

At step 580, the officer/user retrieves at least one document from the receptacle 314.

Alternatively, the step 580 may entail the officer/user retrieving at least one document 400 digitally via the user's personal digital device 505 instead of removing a physical document 400 from the receptacle 314. Current regulations typically require presenting physical documents 400 to a requesting officer or user, but it is contemplated that such documents 400 may be provided digitally upon demand. The process/method 500/600 would typically be identical in this instance, but after the verification process in steps 510 and 520 have been completed, the remote data center would transmit a secure link to the officer's personal digital device 505 and/or display a website address and/or barcode and/or QR code on an output interface 326 from which the officer might use his or her personal digital device to access the at least one document 400 in a digital format.

The method may also include any one or more of the following steps (not illustrated, but understood plainly from the text) in any combination with any other steps of FIGS. 7 and 8. These steps include: returning the at least one document to the receptacle 314 and closing the door; and/or providing confirmation to the remote data center 160 that the officer/user has closed the at least one door 310 and the vehicle 100 is allowed to depart; and/or obtaining a vehicle key from a key box 328 in the receptacle 314.

The previous description is provided to enable practice of the various aspects described herein. Various modifications to these aspects will be understood, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order and are not meant to be limited to the specific order or hierarchy presented.

The previous description of the disclosed implementations is provided to enable others to make or use the disclosed subject matter. Various modifications to these implementations will be readily apparent, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated, the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be implemented in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable others to make or use the present disclosure. Various modifications to these examples will be readily apparent, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A document lockbox system for use in an autonomous vehicle, the document lockbox system comprising:
    a receptacle positioned within an exterior body panel of the autonomous vehicle, wherein the receptacle comprises a compartment sized to hold a document containing information used to satisfy statutory or regulatory requirements;
    at least one document retention device configured to secure the document within the compartment of the receptacle, wherein the at least one document retention device retains the document in the receptacle and permits the document to be retrieved by a verified authority from the receptacle and returned to the receptacle;
    a door that provides access into the receptacle from an exterior of the autonomous vehicle;
    at least one lock configured to lock the door and to unlock the door;
    a lock interface configured to allow a user to actuate the at least one lock; and
    at least one processor and a memory operably coupled with the at least one processor, wherein the memory stores instructions that, in response to execution of the instructions by the at least one processor, cause the at least one processor to perform operations including:
    actuating the at least one lock to one of lock and unlock the at least one lock.

2. The document lockbox system of claim 1, wherein the instructions that, in response to execution of the instructions by the at least one processor, cause the at least one processor to perform operations including receiving a lock interface code from a remote data center.

3. The document lockbox system of claim 1, further comprising at least one lock sensor configured to detect at least one of a locked position and an unlocked position of the at least one lock.

4. The document lockbox system of claim 3, wherein the instructions that, in response to execution of the instructions by the at least one processor, cause the at least one processor to perform operations including receiving a lock position signal from the at least one lock sensor.

5. The document lockbox system of claim 1, comprising a door sensor configured to detect at least one of an open position and a closed position of the door.

6. The document lockbox system of claim 5, wherein the instructions that, in response to execution of the instructions by the at least one processor, cause the at least one processor to perform operations including receiving a door position signal from the door sensor.

7. The document lockbox system of claim 1, further comprising a door actuation mechanism configured to at least one of open the door and close the door.

8. The document lockbox system of claim 1, wherein the at least one document retention device is one of a strap or a metal band.

9. The document lockbox system of claim 1, wherein the lock interface comprises one of a keypad, a touchpad, and a combination lock.

10. The document lockbox system of claim 1, further comprising an output interface electrically coupled to the at least one processor, the output interface being configured to display at least one datum to the user.

11. The document lockbox system of claim 1, further comprising a key box positioned within the receptacle.

12. An autonomous vehicle, comprising:
- a power train;
- a receptacle positioned within an exterior body panel of the autonomous vehicle, wherein the receptacle comprises a compartment sized to hold a document containing information used to satisfy statutory or regulatory requirements; and
- a document lockbox system that includes:
  - at least one document retention device configured to secure the document within the compartment of the receptacle; wherein the at least one document retention device retains the document in the receptacle and permits the document to be retrieved by a verified authority from the receptacle and returned to the receptacle;
  - a door that provides access into the receptacle from an exterior of the autonomous vehicle;
  - at least one lock configured to lock the door and to unlock the door;
  - a lock interface configured to allow a user to actuate the at least one lock; and,
- a vehicle control system that provides one of full control and semi-autonomous control over the autonomous vehicle and includes:
  - at least one processor and a memory operably coupled with the at least one processor, wherein the memory stores instructions that, in response to execution of the instructions by the at least one processor, cause the at least one processor to perform operations including:
- actuating the at least one lock to one of lock and unlock the at least one lock.

13. The autonomous vehicle of claim 12, wherein the at least one document retention device is one of a strap or a metal band.

14. The autonomous vehicle of claim 12, wherein the vehicle is a truck.

15. The autonomous vehicle of claim 12, wherein the instructions that, in response to execution of the instructions by the at least one processor, cause the at least one processor to perform operations including receiving a lock interface code from a remote data center.

16. The autonomous vehicle of claim 12, wherein the document lockbox system further comprises at least one lock sensor configured to detect at least one of a locked position and an unlocked position of the at least one lock.

17. The autonomous vehicle of claim 16, wherein the instructions that, in response to execution of the instructions by the at least one processor, cause the at least one processor to perform operations including receiving a lock position signal from the at least one lock sensor.

18. A vehicle control system for an autonomous vehicle, comprising:
- a document lockbox system that includes:
  - a receptacle positioned within an exterior body panel of the autonomous vehicle, wherein the receptacle comprises a compartment sized to hold a document containing information used to satisfy statutory or regulatory requirements;
  - at least one document retention device configured to secure the document within the compartment of the receptacle, wherein the at least one document retention device retains the document in the receptacle and permits the document to be retrieved by a verified authority from the receptacle and returned to the receptacle;
  - a door that provides access into the receptacle;
  - at least one lock configured to lock the door and to unlock the door;
  - at least one lock interface configured to allow a user to actuate the at least one lock; and
  - at least one processor and a memory operably coupled with the at least one processor, wherein the memory stores instructions that, in response to execution of the instructions by the at least one processor, cause the at least one processor to perform operations including:
    - actuating the at least one lock to one of lock and unlock the at least one lock.

19. The vehicle control system of claim 18, wherein the instructions that, in response to execution of the instructions by the at least one processor, cause the at least one processor to perform operations including receiving a lock interface code from a remote data center.

20. The vehicle control system of claim 18, wherein the document lockbox system further comprises at least one lock sensor configured to detect at least one of a locked position and an unlocked position of the lock and wherein the instructions that, in response to execution of the instructions by the at least one processor, cause the at least one processor to perform operations including receiving a lock position signal from at least one lock sensor.

* * * * *